(12) United States Patent
Matsumoto

(10) Patent No.: US 7,147,026 B2
(45) Date of Patent: Dec. 12, 2006

(54) VEHICLE TIRE

(75) Inventor: Tadao Matsumoto, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 103 days.

(21) Appl. No.: 10/290,234

(22) Filed: Nov. 8, 2002

(65) Prior Publication Data

US 2003/0084979 A1 May 8, 2003

(30) Foreign Application Priority Data

Nov. 8, 2001 (JP) .............................. 2001-343612
Dec. 14, 2001 (JP) .............................. 2001-382061

(51) Int. Cl.
*B60C 13/02* (2006.01)
(52) U.S. Cl. ..................... 152/523; D12/605
(58) Field of Classification Search ................ 152/523, 152/524; D12/605
See application file for complete search history.

(56) References Cited

U.S. PATENT DOCUMENTS 4,823,856 A * 4/1989 Roberts
5,303,758 A * 4/1994 Clementz et al. ........... 152/523
6,032,711 A * 3/2000 Barrese et al.
6,053,228 A * 4/2000 Baker ......................... 152/523

FOREIGN PATENT DOCUMENTS

JP 8-282215 A * 10/1996
WO WO 00/13922 A1 * 3/2000

* cited by examiner

*Primary Examiner*—Geoffrey L. Knable
(74) *Attorney, Agent, or Firm*—Birch, Stewart, Kolasch & Birch, LLP

(57) ABSTRACT

A tire comprises a sidewall provided with a mark region for displaying at least one mark including at least one of a sold mark and an outline mark, the mark region is provided with serration made up of serration slots and ridges which are drawn up in lines, the mark is formed by discontinuous parts of the serration, wherein the discontinuous parts of the serration are (1) discontinuous parts of serration slots only or (2) discontinuous parts of ridges only or (3) discontinuous parts of serration slots and discontinuous parts of ridges, wherein the discontinuous part of the serration slot is a shallow part formed within the serration slot and having a top face extending across a corresponding part of the mark in substantially parallel with a tire sidewall surface.

3 Claims, 11 Drawing Sheets

VEHICLE TIRE

The present invention relates to a vehicle tire having a mark region on the sidewall, more particularly to a region provided with serration having discontinuous parts constituting a mark.

In general, the pneumatic tires are provided in the sidewalls with many marks. Here, the word "mark" is meant for a character, monogram, design or the like, and the mark may have various kinds of shapes without special limitation. Using such marks, brand name, trade name, tire size, manufacturer, instruction, geometric design and the like are expressed. The marks in a sidewall include marks for which particular visibility is required, and marks for which particular visibility is not required although a certain degree of visibility is of course required. The former may be the brand name, trade name, geometric design and the like. The latter may be the tire size, classification, manufacturer, instruction and the like. Conventionally, marks are formed by protrusion on the sidewall, and in order to change the visibility the size of the mark is changed. If size change is not enough, the protruding height is increased to increase the visibility.

In such case, however, as the sidewall is subjected to significant bending deformation during running, there is a tendency for the sidewall to generate cracks at the edge of a thick protrusion. Further, if the protrusion is relatively high, the corner around the protrusion is liable to get dirt in use.

It is therefore, an object of the present invention to provide a vehicle tire, in which apparent difference in visibility can be provided between more-visible marks and less-visible marks without increasing the protruding height of the more-visible mark and without significantly decreasing the size of the less-visible mark.

According to the present invention, a tire comprises a sidewall provided with a mark region for displaying at least one mark including at least one of a sold mark and an outline mark, the mark region provided with serration made up of serration slots and ridges therebetween, the mark formed by discontinuous parts of the serration, wherein the discontinuous parts of the serration are (1) discontinuous parts of serration slots only or
(2) discontinuous parts of ridges only or
(3) discontinuous parts of serration slots and discontinuous parts of ridges, wherein the discontinuous part of the serration slot is a shallow part formed within the serration slot and having a top face extending across a corresponding part of the mark in substantially parallel with a tire sidewall surface.

In case of a solid mark, the top face of the shallow part extends across the thickness of the contour line of the mark. In case of outline mark, the top face extends across the body of the mark.

Therefore, the mark which is formed by discontinuous parts of the serration slots and/or ridges drawn up in lines, may have less visibility when compared with a mark formed by a protrusion protruding from the serration. Thus, if the mark is used in combination with the mark of this protrusion type, apparent difference in the visibility can be obtained without increasing the protruding height. Further, the mark will change its visibility and view according to the view angle, which is preferable for variety's sake.

Embodiments of the present invention will now be described in detail in conjunction with the accompanying drawings.

Figure 1A:
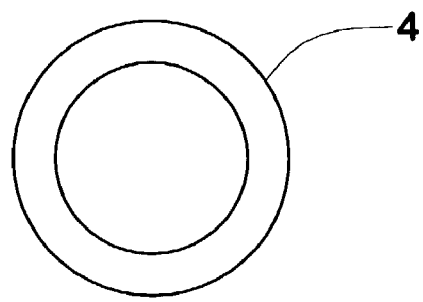
FIGS. 1a, 1b and 1c are diagrams each showing an example of the mark region on a tire sidewall.

In the drawings, vehicle tire 1 according to the present invention is a pneumatic tire 1 comprising a tread portion, a pair of beads and a pair of sidewalls 2.

Figure 1B:
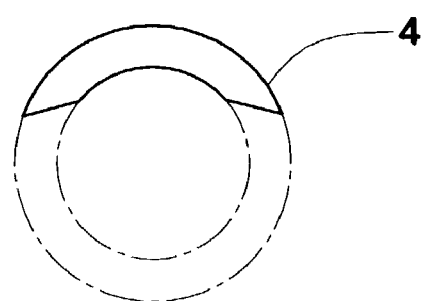
Figure 1C:
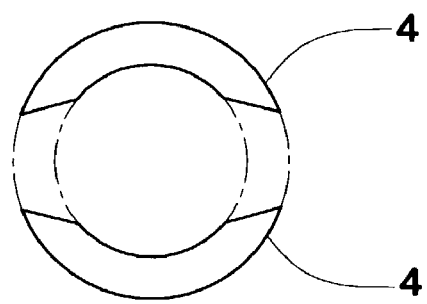

A mark region 4 is provided on at least one of the sidewalls 2. As shown in FIGS. 1a, 1b and 1c, the mark region 4 may be an annular region extending continuously around the tire axis (FIG. 1a), an independent region (FIG. 1b), one of discontinuous or independent regions such as arc regions arranged circularly around the tire axis (FIG. 1c).

The mark region 4 is a serrated region for displaying at least one mark 5 by utilizing discontinuity of the serration 3. In this invention, the discontinuity of serration 3 means the following three cases:

(1) discontinuity of serration slots 6 only;
(2) discontinuity of only the ridges 7 formed between serration slots 6; and
(3) both of the discontinuity of slots 6 and discontinuity of ridges 7.

In the serration 3 around a mark 5, the serration slots 6 and ridges 7 extend linearly in the substantially same direction, and there is no slot (ridge) extending in another direction. The slots 6 and ridges 7 are thus substantially parallel with each other.

Preferably, the serration pitches P or the distances between the slots 6 (or ridges 7) are constant although it is possible to locally change the pitches for variety's sake.

Figure 2:
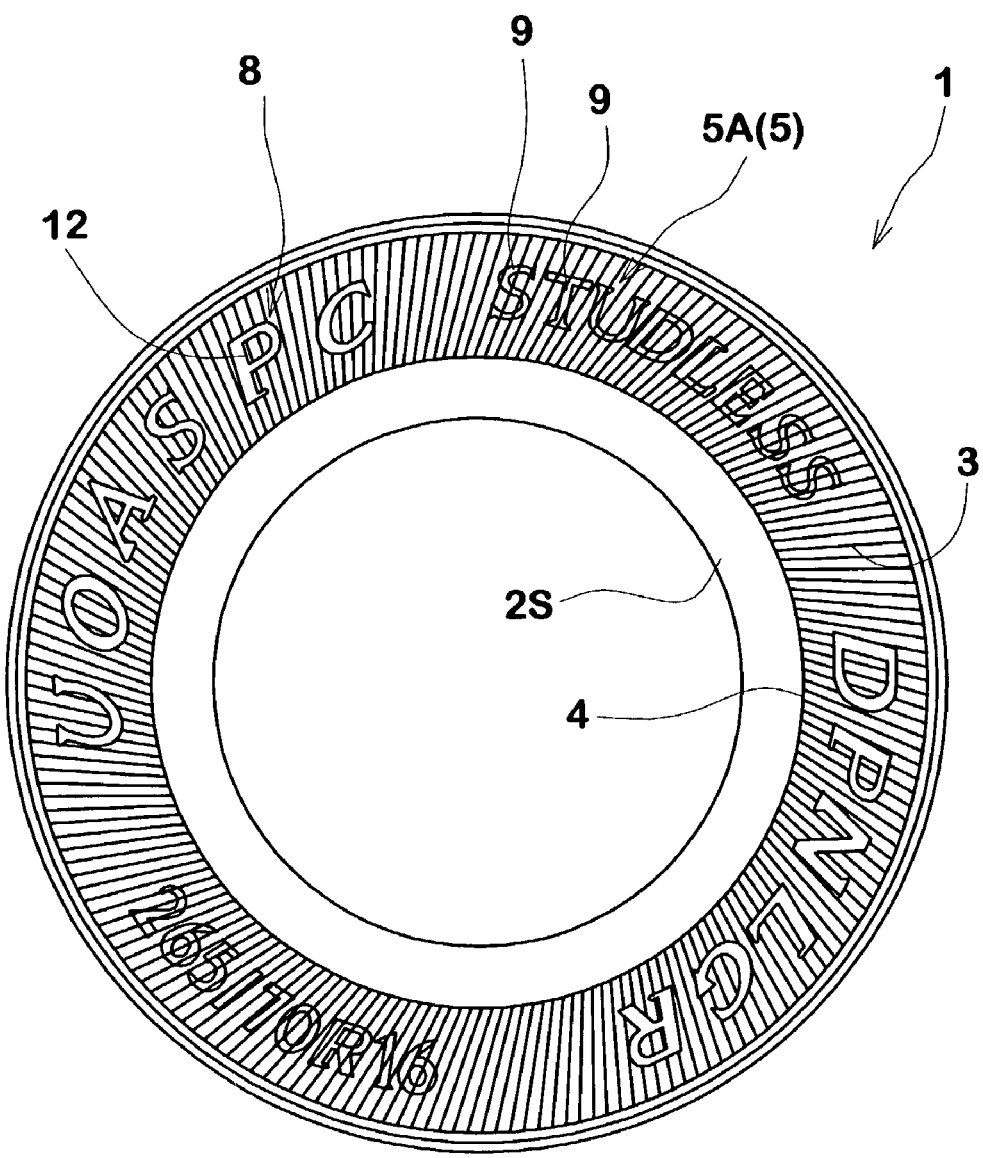
FIG. 2 shows a mark region according to the present invention.

FIG. 2 shows an embodiment of the present invention, wherein the mark region 4 is an annular region on the sidewall 2 extending continuously around the tire axis.

The mark region 4 includes marks 5A each constructed by discontinuity of serration slots 6.

Figure 3:
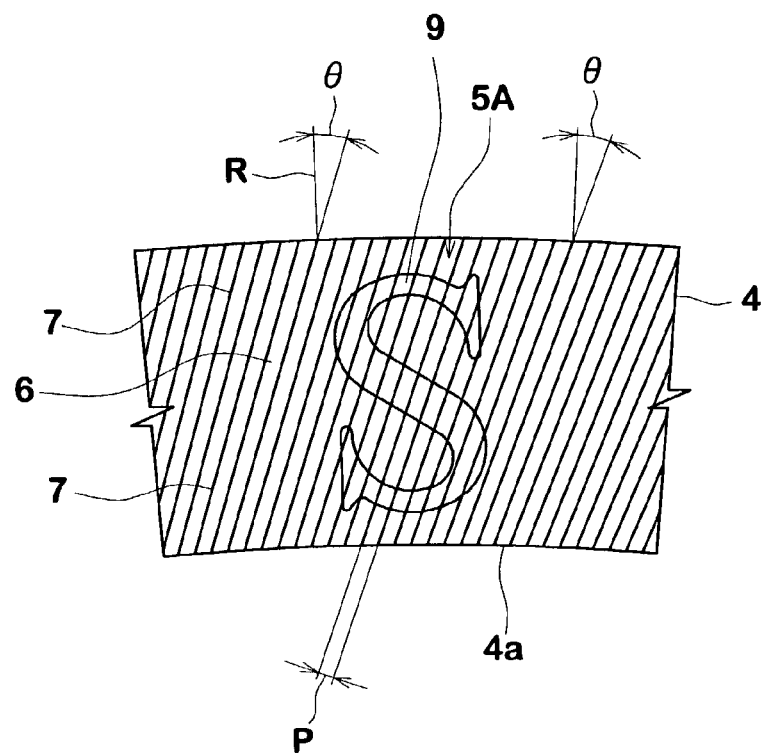
FIG. 3 is an enlarged schematic view showing a mark and surrounding serration.

In this example, all the slots 6 and ridges 7 in the mark region 4 are inclined at a constant angle θ with respect to the radial direction R of the tire. Thus, as shown in FIG. 3, in a local region around a mark 5(5A), the slots 6 and ridges 7 are substantially parallel with each other.

The inclination angle θ with respect to the tire radial direction R is set in the range of from 0 to 45 degrees, preferably in the range of from about 10 to about 30 degrees (in this example about 20 degrees).

The serration pitches P are set in the range of from 0.6 to 1.5 mm at the radially inner end 4a of the annular mark region 4.

Figure 4:
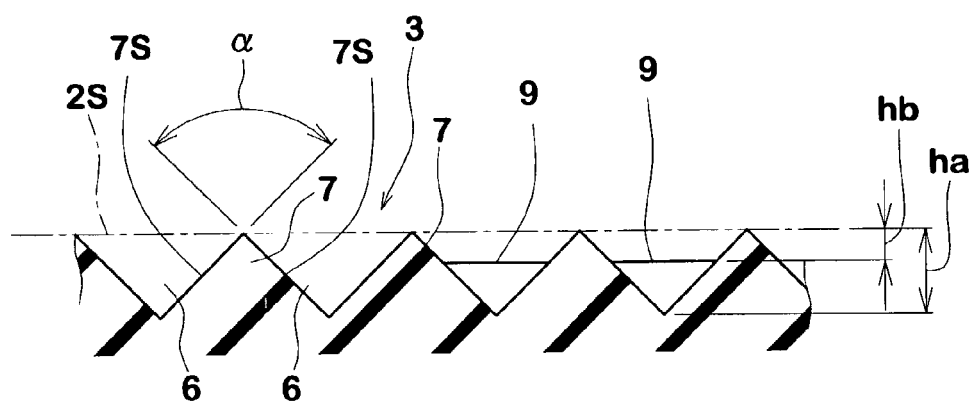
FIG. 4 is an enlarged cross sectional view of the serration.

As shown in FIG. 4, the serration slots 6 in this example have a triangular cross sectional shape. Also the ridges 7 have a triangular cross sectional shape, the apex angle α of which is substantially 90 degrees. The ridge 7 has two lateral faces 7S which are flat and are inclined at about 45 degrees with respect to the sidewall surface 2S.

In this example, the apex or the tops of the ridges 7 are the same level as the sidewall surface 2S.

Figure 5:
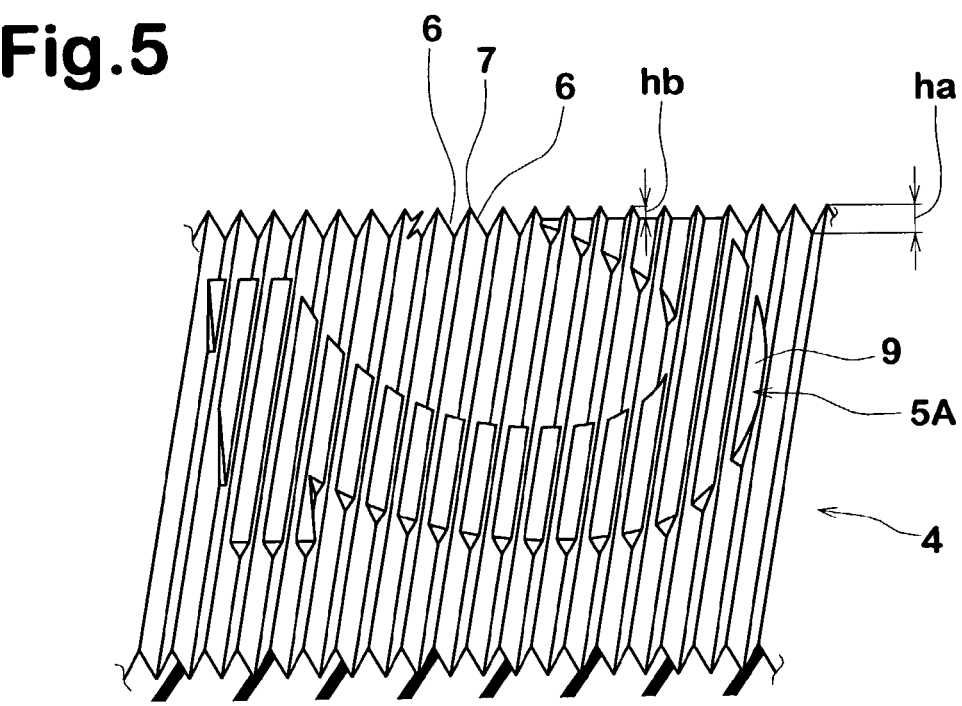
FIG. 5 is an enlarged perspective view showing a part of a mark formed by discontinuity of the serration slots.

As shown in FIG. 5, specific slots 6 are provided therein with shallow parts 9 to render the slots discontinuous. The shallow parts 9 which collectively represent a mark 5A have the same depth (hb) in the range of from 30 to 70% of the depth (ha) of the slots 6. The shallow part 9 is flat and the surface is parallel with the sidewall surface 2S in contrast to the lateral faces 7S. The shallow parts 9 extend only in a place corresponding to the shape of the mark.

Specifically, in case of a solid mark as shown in FIG. 5, the shallow part 9 extend across a corresponding part of the mark. In case of outline mark, the shallow part 9 extend across a corresponding part of the contour line (which of course has a positive width) of the mark.

In FIG. 2, letter strings "STUDLESS" and "265/70R16" are the marks 5A, namely, the above-mentioned case (1).

Such a mark 5A is preferably used when less visibility is required because the shallow parts 9 are lower than the ridges 7 and can hide themselves behind the ridges.

Figure 6:
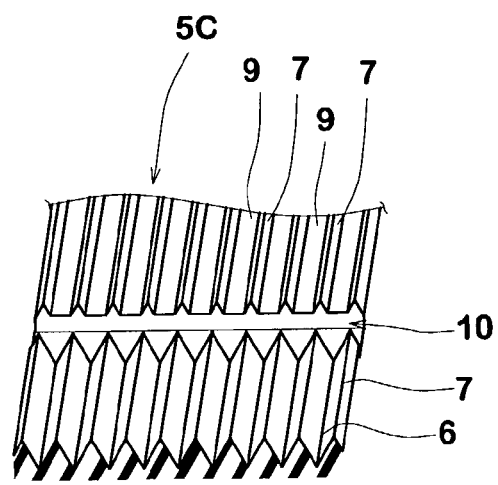
FIG. 6 is an enlarged perspective view showing a combination of discontinuity of serration slots and discontinuity of ridges.

In case little more visibility is required, as shown in FIG. 6, it is possible to break the ridges 7 at the ends of the shallow parts 9. In other words, the ridges 7 adjacent to the shallow parts 9 are provided with breaking parts 10 along the edge of the mark irrespective of solid mark or outline mark. However, in case of an outline mark, probably the breaking length becomes the same order as the width of the contour line. This is not preferable. Therefore, this method will be preferably applied to a solid mark rather than an outline mark. This type of mark 5C is thus the above-mentioned case (3).

Figure 7:
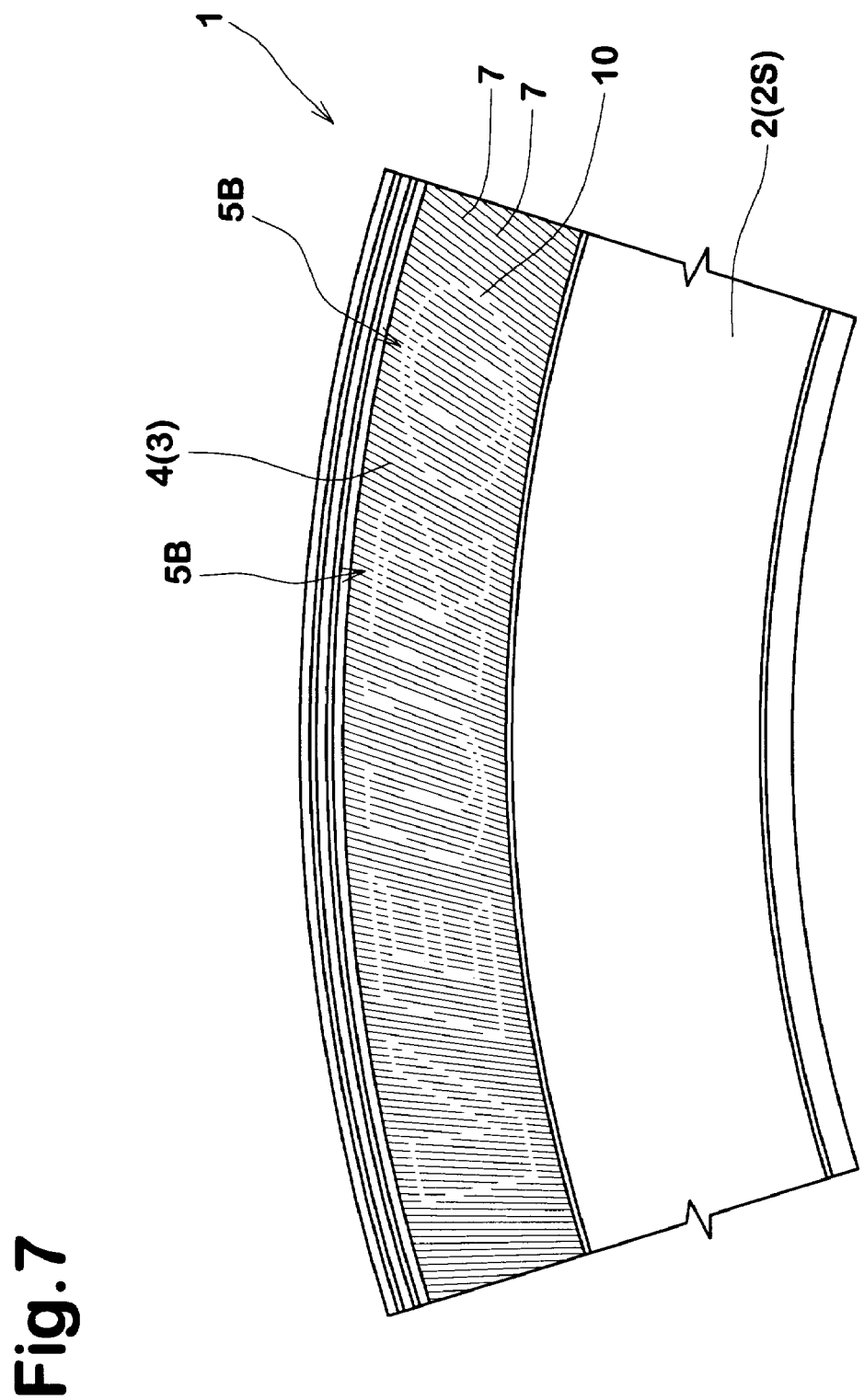
FIG. 7 shows another example of the mark region according to the present invention.
Figure 8:
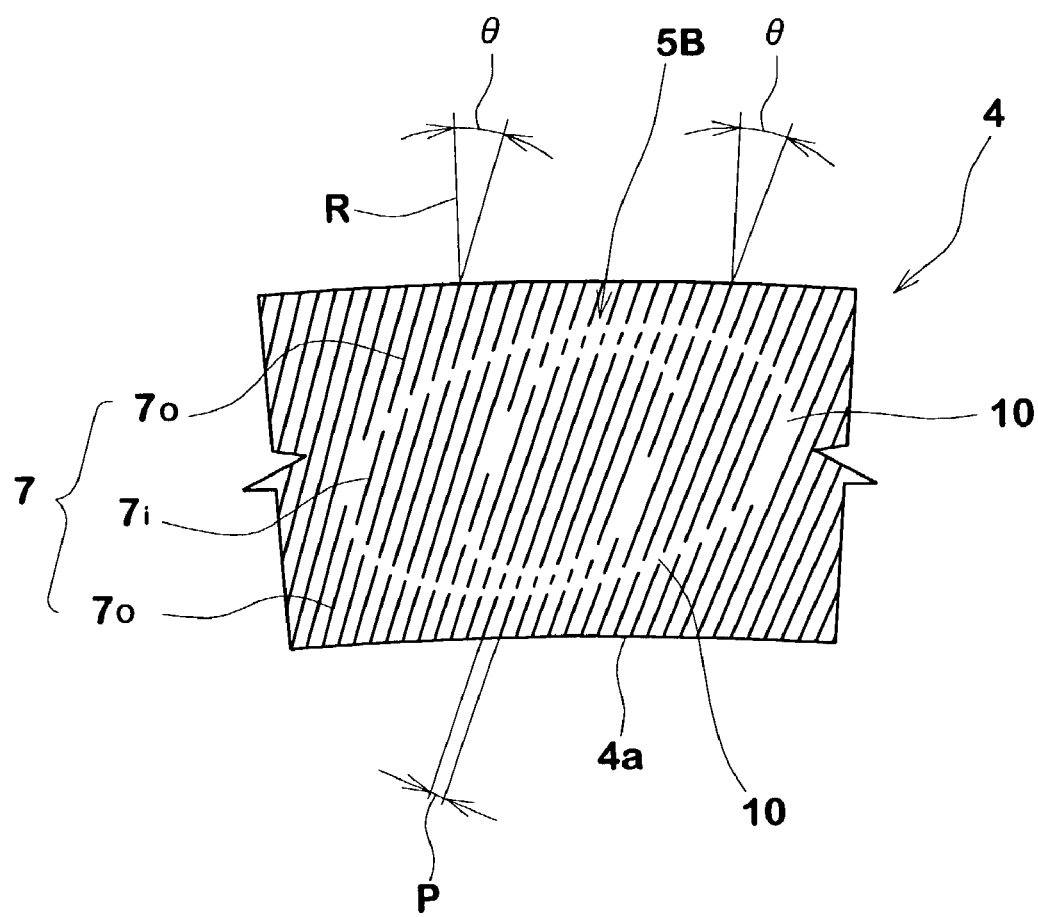
FIG. 8 is an enlarged schematic view showing a mark thereof formed by discontinuity of ridges only.

FIG. 7 shows the above-mentioned case (2). In this example, marks 5B are expressed by discontinuity of the ridges 7 only. AS shown in FIG. 8, the breaking parts 10 of ridges 7 are formed on or across the contour line of the mark. Therefore, this method may be suitably applied to outline marks. In particular case shown in FIG. 8, as the mark represents an italic character "O", the contour line is a double circle, and the breaking parts are arranged into the double circle.

Thus, each breaking part extends across the corresponding part of the double circle or the mark.

Figure 9:
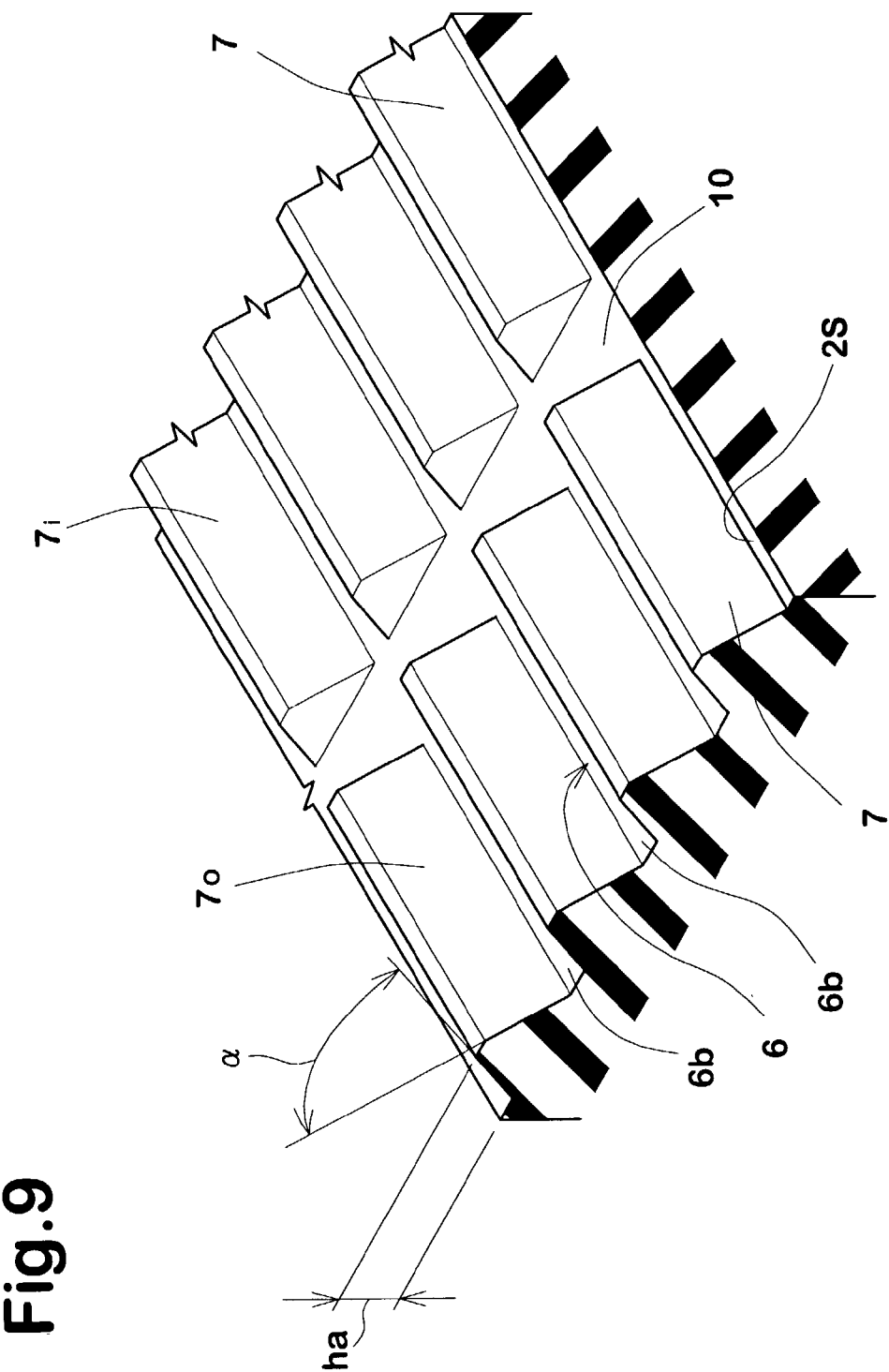
FIG. 9 is an enlarged perspective view showing breaking parts of the ridges thereof.

When the mark region 4 includes this type of marks only as shown in FIG. 7, it is preferable that the base of the breaking parts 10 is the same level as the sidewall surface 2S as shown in FIG. 9. In other words, the ridges 7 protrude from the sidewall surface 2S. The height (ha) of the ridges 7 is preferably in the range of from 0.2 to 0.8 mm. In this example, in addition to the base of the breaking parts 10, the bottom 6b of the slots 6 is the same level as the sidewall surface 2S.

The serration pitches P are constant and not more than 1.0 mm at the radially inner end 4a of the mark region 4.

Therefore, depending on the view angle, the ridges 7 appear to continue even at the breaking parts 10 and thus the mark 7 almost disappears.

In case more visibility is required than the above-mentioned three types of marks 5A, 5B and 5C, it is possible to use another type of mark 8 in combination with the marks 5A, 5B, 5C.

Figure 10:
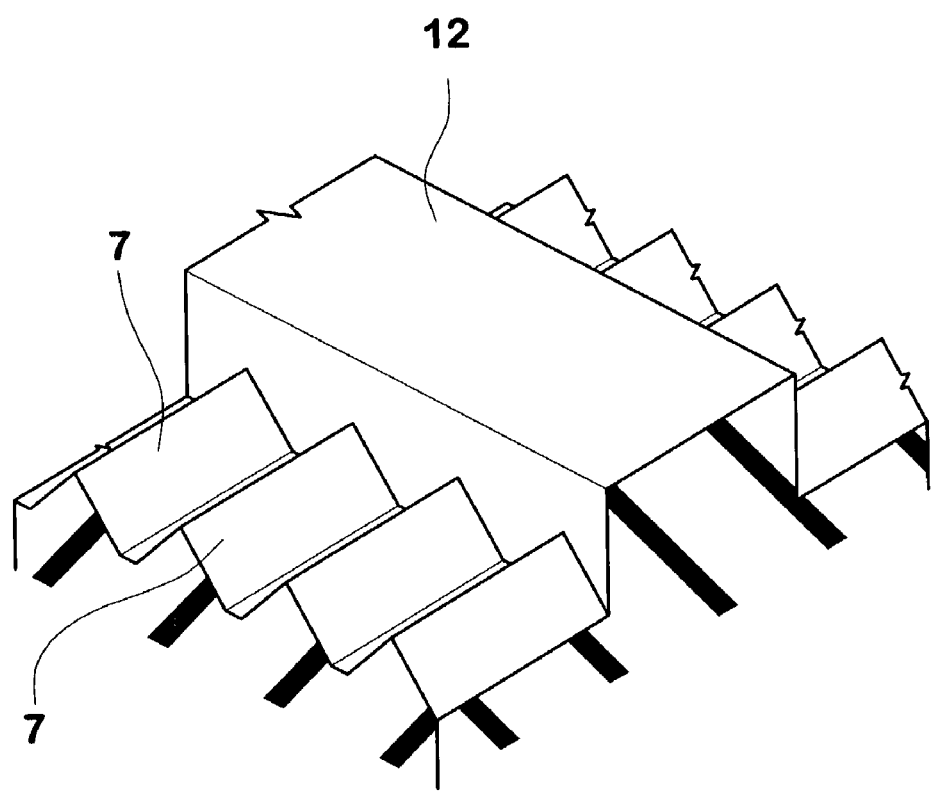
FIG. 10 is an enlarged perspective view for explaining another mark formed by protrusion from the serration.

In the example shown in FIG. 2, letter strings "DPNLGR" and "UOASPC" are such a mark 8. The mark 8 is as shown in FIG. 10, formed by a protrusion 12 protruding from the serration 3 over the tops of the ridges 7, and the shape of the protrusion 12 is the same as the shape of the mark irrespective of solid mark or outline mark. Preferably, the top surface of the protrusion 12 is not serrated to be a flat face parallel with the sidewall surface.

As the marks 8 protrude from the serration 3, the visibility thereof is high in contrast to the marks 5A, 5B and 5C. Further, the visibility of the marks 5A, 5B and 5C varies from almost zero to a certain degree according to the viewing angle. Therefore, by using the marks 8 in combination with the marks 5, it becomes possible to provide wide variations for the expression of the marks to leave a strong impression thereon.

Figure 13:
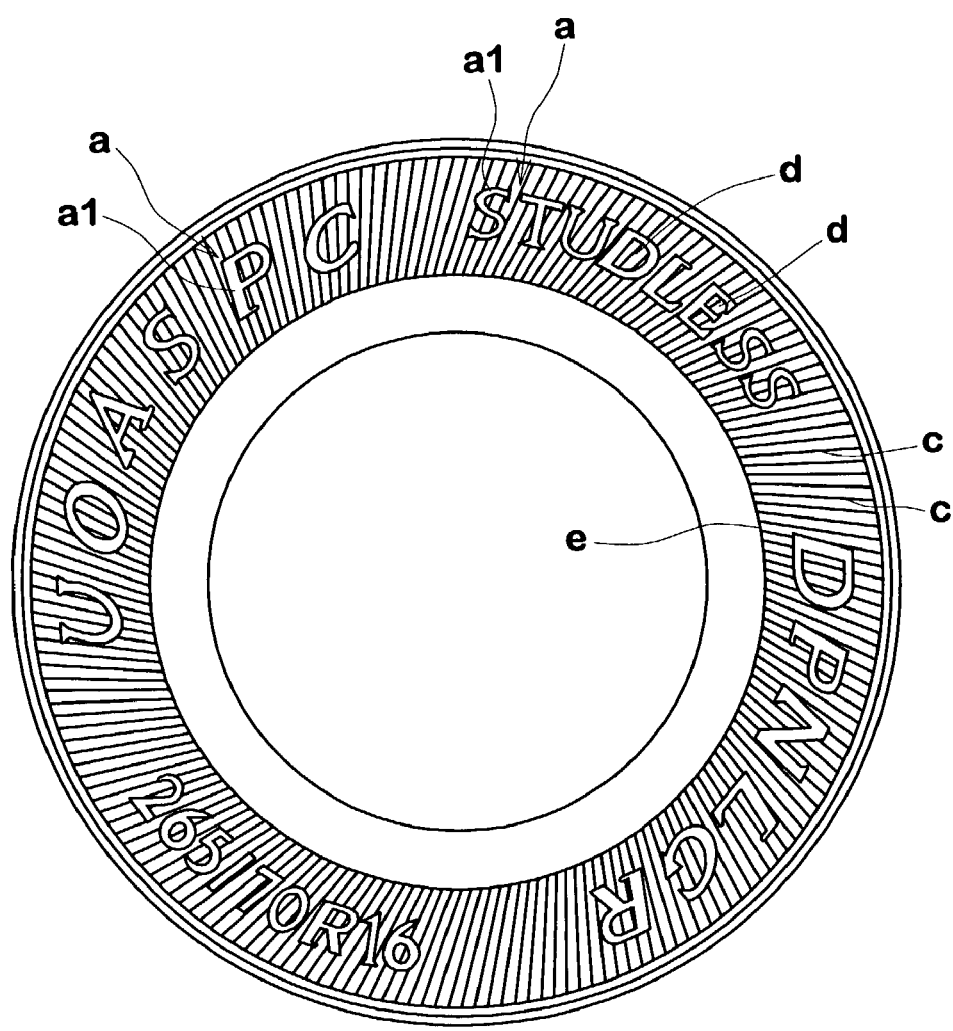
FIG. 13 shows a mark region as a comparative example which is similar to FIG. 2 but all the marks are formed by protrusions.

In comparison with the protrusions 12, in case of the shallow parts 9 and breaking parts 10, the mark region in the tire sidewall has higher resistance to bending fatigue and cracks. Therefore, the durability of the tire sidewall may be improved when compared with a case all the marks are formed by protrusions 12 as shown in FIG. 13. And it may be difficult to get dirt.

In the above-mentioned embodiments, as the fundamental structure of the serration 3, the cross sectional shape of each serration slot or ridge does not vary along the length thereof if the discontinuity of the serration is left out of consideration. As to the cross sectional shape of the ridge or slot, an isosceles triangle as shown in FIG. 4 and an isosceles trapezoid as shown in FIG. 9 are preferably used.

It is however, also possible to use another shape such as inequilateral triangle, right-angle triangle and inequilateral trapezoid.

Further, it may be possible to vary the cross sectional shape of the ridge and/or slot independently of their discontinues parts (3, 10) for more visibility or for variety's sake. For example, in case of FIG. 9, each of the ridges 7 each of which is provided with at least one breaking part 10 has a fixed cross sectional shape along the length thereof through the breaking part(s) 10 thereof. In other words, with respect to one ridge 7, a part 7i inside the mark and a part 7o outside the mark are the same cross sectional shape. However, it may be possible to change the section shape between the inside part 7i and outside part 7o for example as shown in FIGS. 11a and 11b.

Figure 11A:
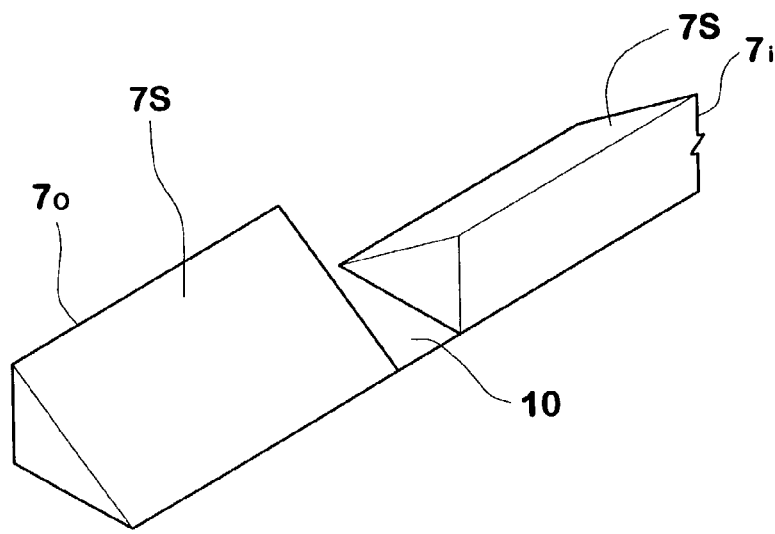
FIGS. 11a and 11b are enlarged perspective views showing examples of the cross sectional shape of ridges.
Figure 11B:
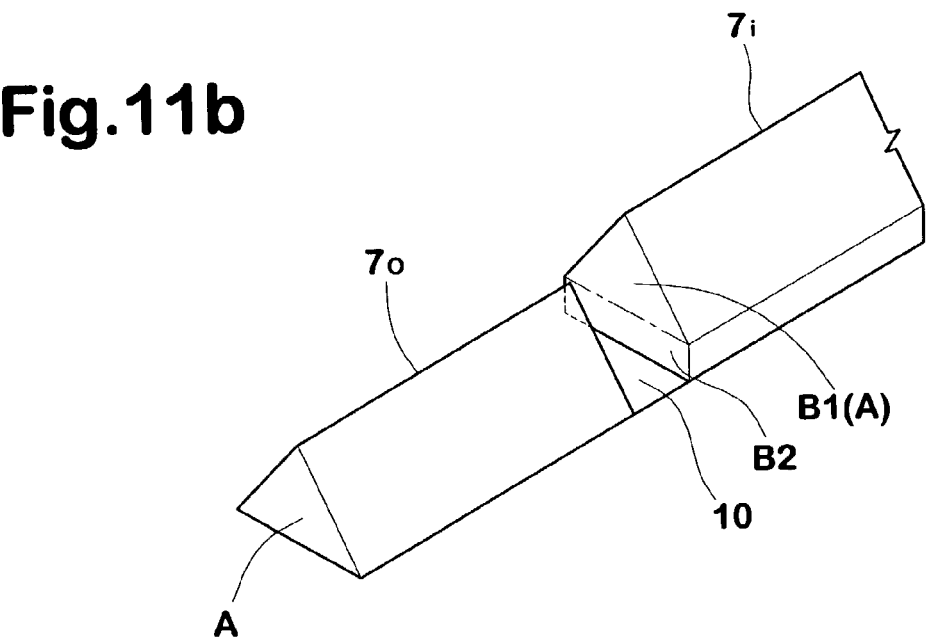

In FIG. 11a, the inside and outside parts 7i and 7o have symmetrical sectional shapes wherein one of the lateral faces 7S is inclined gently but the other is perpendicular in order to alter the reflection of light through the breaking parts 6. In FIG. 11b, the section shape of the outside ridge part 7o is an isosceles triangle (A), and that of the inside ridge part 7i is such that a rectangle B2 for increasing the ridge height (ha) is added under the isosceles triangle (A).

Figure 12:
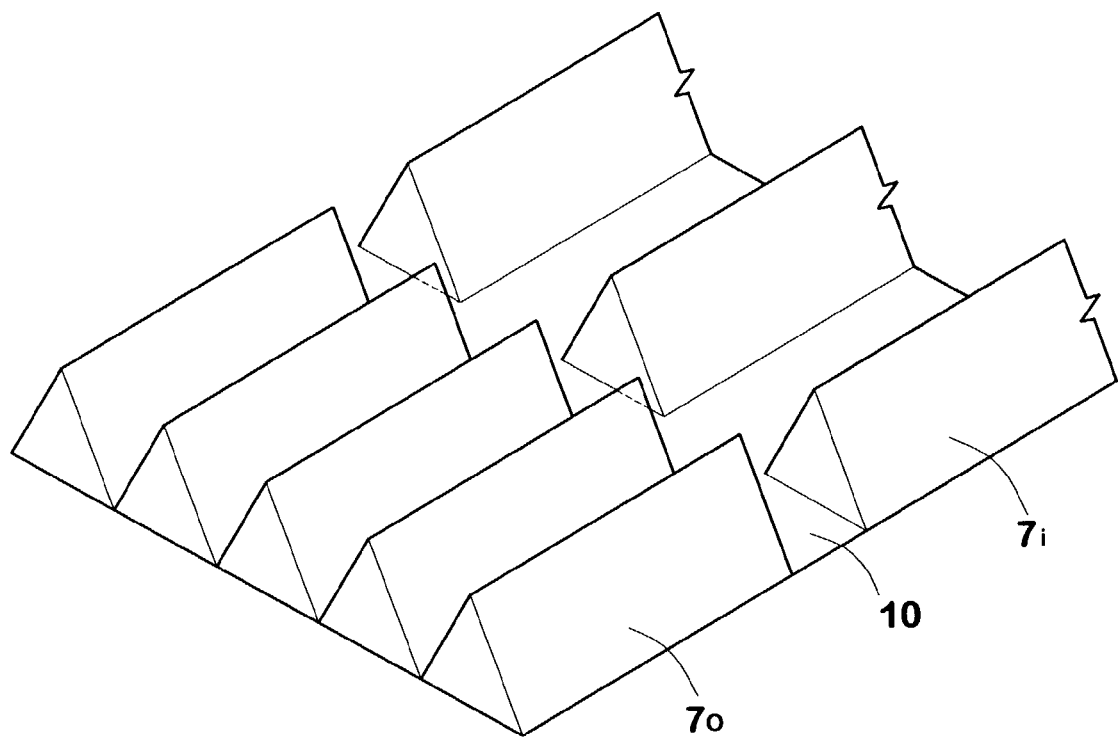
FIG. 12 is an enlarged perspective view showing an example of the arrangement of ridges.

In FIG. 12, the sectional shapes are not changed between the parts 7i and 7o, but the density of the serration is changed by partially increasing the pitches of the ridges 7. In this example, the density of the inside part 7i is ½ of the density of the outside part 7o. Such a density change may be possible for variety's sake.

Furthermore, as to the conventional type of mark 8, it is preferable that the top surface of the protrusion 12 is flat as described above. But, if the top surface is serrated, it is preferable that the serration is different from the above-mentioned serration 3 in respect of at least one of the formation of the ridges, sizes, pitches, cross sectional shape and the like.

As to the depths (hb) of the shallow parts 9, as explained above, the depths (hb) are basically constant with respect to each of the marks 5. In other words, the depth may be changed between different marks 5. Further, the following modifications may be also possible. For example, in case a mark 5 overlaps another mark 5, the overlapped part may have different depth than the not overlapped part. Further, it may be also possible to additionally change the depth between the not overlapped part of one mark 5 and that of the other mark 5. In case a mark includes completely another mark, it may be possible that the included mark has a shallower depth than the including mark or vice versa.

The invention claimed is:

1. A tire comprising:

a sidewall provided with a mark region for displaying at least one mark, the mark region being defined as a serrated region provided with serrations made up of substantially parallel serration slots and continuous ridges therebetween, wherein said continuous ridges are inclined at a constant angle ($\theta$) in a range of from 0 to 45 degrees with respect to the tire radial direction, each said at least one mark is a solid mark or alternatively an outline mark formed by discontinuous parts of the serration slots only, each said discontinuous part is a shallow part formed within one of the serration slots and having a top face extending across a corresponding part of the mark in substantially parallel with a tire sidewall surface, and adjacent ridges each extend continually across a corresponding part of the mark.

2. The tire according to claim 1, wherein said mark region further includes another kind of a second mark which is formed by a protrusion protruding from the tops of the ridges and having the same shape as the shape of the second mark.

3. The tire according to claim 1, wherein the mark region is an annular region that extends continuously around the tire axis.

* * * * *